United States Patent [19]
Jarkowski

[11] Patent Number: 5,634,408
[45] Date of Patent: Jun. 3, 1997

[54] VEHICLE CARGO TRAY

[76] Inventor: Stuart J. Jarkowski, 10 Addleton Ct., Reisterstown, Md. 21136

[21] Appl. No.: 584,744

[22] Filed: Jan. 11, 1996

[51] Int. Cl.$^6$ ................................................ A47B 23/00
[52] U.S. Cl. ................................................ 108/44; 414/522
[58] Field of Search .................... 108/44, 60; 296/26; 414/522

[56] References Cited

U.S. PATENT DOCUMENTS

| | | |
|---|---|---|
| D. 333,112 | 2/1993 | Diaco et al. . |
| 2,852,303 | 9/1958 | Hopson . |
| 4,681,360 | 7/1987 | Peters et al. . |
| 4,824,158 | 4/1989 | Peters et al. . |
| 4,958,876 | 9/1990 | Diaco et al. . |
| 5,046,913 | 9/1991 | Domek et al. . |
| 5,052,878 | 10/1991 | Brockhaus . |
| 5,064,335 | 11/1991 | Bergeron . |

*Primary Examiner*—Jose V. Chen
*Attorney, Agent, or Firm*—Leonard Bloom

[57] ABSTRACT

A cargo tray in combination with a vehicle having cargo space. The cargo tray has rollers on the bottom of the body portion and is slidably disposed in the vehicle independent of the vehicle. The cargo tray is partially removable from the vehicle and is supported by a first pair of legs. The cargo tray is further completely removable from the vehicle and is self supporting on the first pair of legs and a second pair of legs. Ribs are formed on the body of the cargo tray. Wells of differing sizes are formed in the body of the cargo tray to retain cargo in the form of buckets. Notches are formed in the walls of the cargo tray to receive beams which are used to segment the cargo.

10 Claims, 11 Drawing Sheets

VEHICLE CARGO TRAY

BACKGROUND OF THE INVENTION

The present invention relates to a cargo tray for a vehicle and, in particular, to a cargo tray which is independent of the vehicle, which slidably moves on the bed of the vehicle and may be completely slidably removed from the vehicle to be self supporting.

The use of pickup trucks, station wagons and vans as means of carrying cargo and for business and family use has greatly increased. Users of these vehicles have encountered problems in loading and unloading the vehicles due to the weight and size of some items and also due to the inaccessibility of initially loaded items which are behind or beneath later loaded items. The problem is further compounded in vehicles with caps having a comparatively low roof or cover over the cargo area. Pickup trucks with a tonneau (cover) produce particular problems where the user frequently must crawl onto the truck bed on hands and knees to load or unload items distal from the tailgate of the vehicle. The nature of the cargo such as five (5) gallon containers of liquids and other less easily handled containers are also problems, especially when there is a need to load or unload the item without disturbing the other items in the cargo.

In addition, it is very useful to be able to place the cargo on a tray or movable bed to facilitate loading and unloading of the cargo.

U.S. Pat. No. 2,852,303 to Hopson discloses a sliding unit mounted on rollers within tracks connected to the truck body. U.S. Pat. No. 4,305,695 to Zachrich discloses a pullout tray mounted in guide rails secured to the truck. The tray has an adjustable array of cleats dividing the tray into compartments. U.S. Pat. Nos. 4,681,360 and 4,824,158 to Peters et al disclose a pair of support members arranged for mounting on the floor of a truck with a cargo box on rollers to roll on the support members. Chudick, U.S. Pat. No. 4,993,088 disclose a portable bed assembly for use with a vehicle. The bed assembly is mounted on rollers which ride on rails mounted on the deck of the vehicle. A locking mechanism maintains the assembly on the rails. The assembly, when unlocked, may be rolled partially outwardly and be supported by less. Domek et al, U.S. Pat. No. 5,046,913 disclose a slidable carrying table which is carried by a base frame installed in hold down members on the floor of a vehicle. The carrying table can be slid onto, or off of, the base frame. U.S. Pat. No. 5,052,878, to Brockhaus discloses a retractable bed for a truck has two telescoping rail packs with a deck. The rail packs are mounted to the truck floor. U.S. Pat. No. 5,064,35 to Bergeron et al disclose supports connected to a vehicle and platform engaging the supports. The platform is movable to an extended position with movement limited to prevent separation of the platform from the supports. U.S. Pat. No. 5,090,335 to Russell discloses a table on rollers which reposes in a truck bed and has locking means to clamp the table to the sidewalls of the truck. The table has legs to support the table.

Although these patents are useful for the purposes intended, there still exists a need for a simple system which does not require modification of the vehicle and which enables a user to load a cargo tray, place it in the vehicle, have access while in the vehicle, remove the cargo tray and have it available separate from the vehicle. There is also a need for a cargo tray which provides accommodations for large bucket-type containers and which can be segmented to easily secure any configuration of cargo.

BRIEF SUMMARY OF THE INVENTION

It is one object of the present invention to provide a cargo tray to receive in the cargo space of a vehicle which permits ease of loading and unloading the cargo tray by moving of the cargo tray on and off of the vehicle.

It is another object of the present invention to provide a cargo tray which is independent of the vehicle and requires no components to be permanently installed in the vehicle.

It is yet another object of the present invention to provide a cargo tray which is partially supported by the vehicle and which further is self supporting separately from the vehicle.

It is a further object of the present invention to provide a cargo tray which accommodates bucket type containers of several sizes.

It is yet a further object of the present invention to provide a cargo tray which can be segmented to easily secure any configuration of cargo.

In accordance with the teachings of the present invention, there is disclosed a cargo tray in combination with a vehicle comprising a vehicle bed and at least one pair of laterally spaced wheels therebeneath. The vehicle bed has a bottom, a front wall, a tailgate opposite said front wall and a pair of sidewalls. The bottom of the vehicle bed includes a pair of spaced side portions thereabove to cover said at least one pair of laterally spaced wheels. Each side portion has an edge proximal to the tailgate of the vehicle bed. The cargo tray comprises a body portion having a top, a bottom, two opposite sides, a front end, a back end, a side wall formed on each side, a front wall and a back wall. The walls extend upwardly from the bottom of the body portion. The cargo tray is T-shaped having a first width at a first portion and a second width at a second portion, the first width being greater than the second width. The cargo tray is disposed on the vehicle bed independent of said vehicle, and is capable of being slidably moved outwardly from the vehicle bed a desired length and further is capable of being slidably completely removed from the vehicle bed. When disposed on the vehicle bed, the cargo tray substantially covers the vehicle bed. The first portion of the cargo tray having the greater width extends between the side portions of the vehicle and from the proximal edge of the respective side portions to the tailgate. The second portion of the cargo tray extends between the side portions of the vehicle and from the proximal edge of the respective side portions to the rear wall of the vehicle bed. At least one pair of spaced-apart roller means are attached to the bottom of the body portion wherein the cargo tray is slidably movable along the length of the elongated vehicle bed within the vehicle and wherein the cargo tray is slidably removable from the vehicle bed. A first pair of legs are foldably connected laterally to the bottom of the floor portion near the front end thereof. A second pair of legs are foldably connected longitudinally to the bottom of the floor portion near the back end thereof. When the cargo tray is partially removed from the vehicle, the unfolded first pair of legs support the front end of the cargo tray and the back end of the cargo tray is supported in the vehicle. When the cargo tray is completely removed from the vehicle, the unfolded first pair of legs and the unfolded second pair of legs support the cargo tray independently of the vehicle. A plurality of spaced-apart ribs are formed in the body portion, the ribs being in a herringbone pattern to provide strength to the cargo tray and to support a heavy cargo therein. A plurality of spaced-apart wells are formed in the top of the body portion, wherein cargo is received and retained in said wells to prevent movement and overturning of said cargo.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

DESCRIPTION

Figure 1:
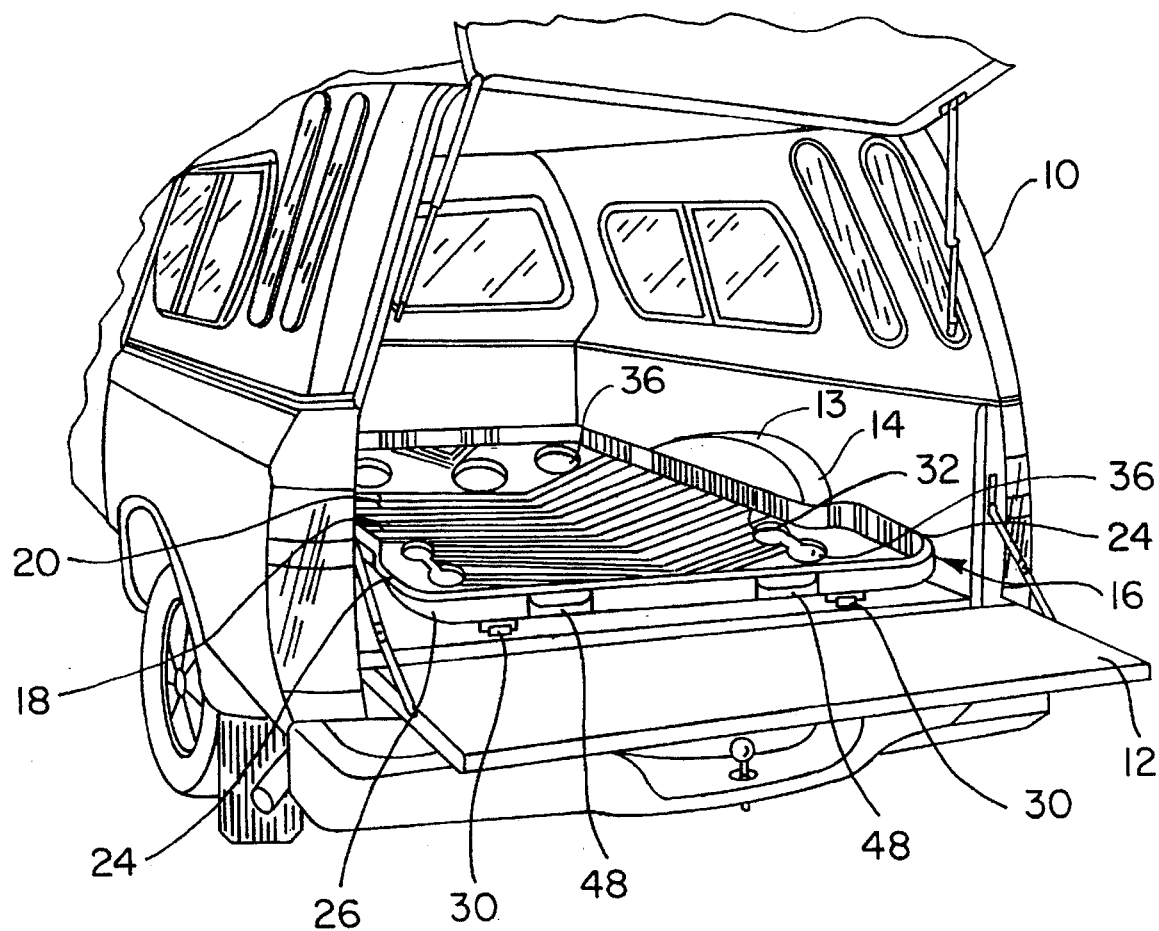
FIG. 1 is a perspective view of a vehicle having the cargo tray of the present invention disposed therein.
Figure 2:
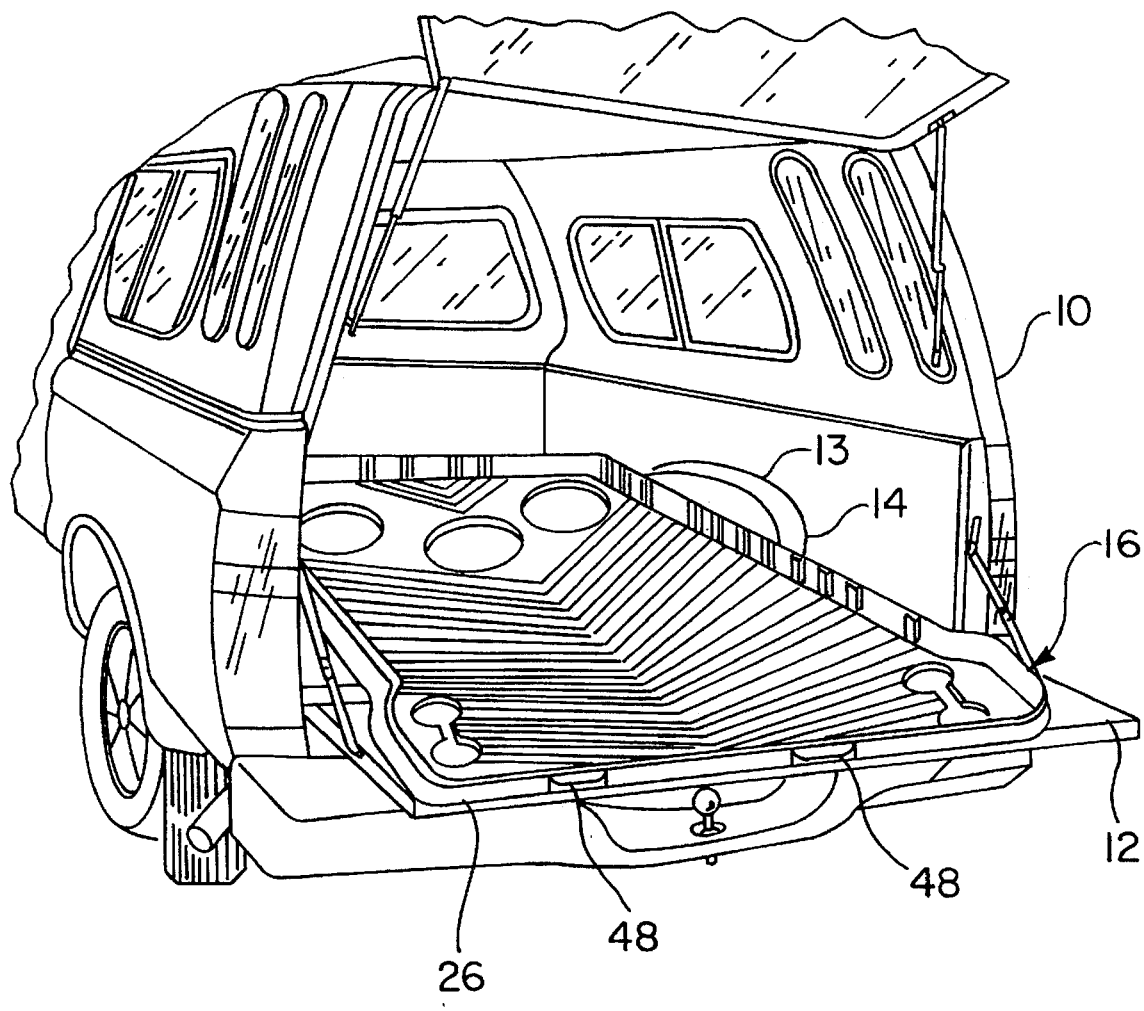
FIG. 2 is a perspective view similar to FIG. 1 showing the cargo tray partially removed from the vehicle.
Figure 3:
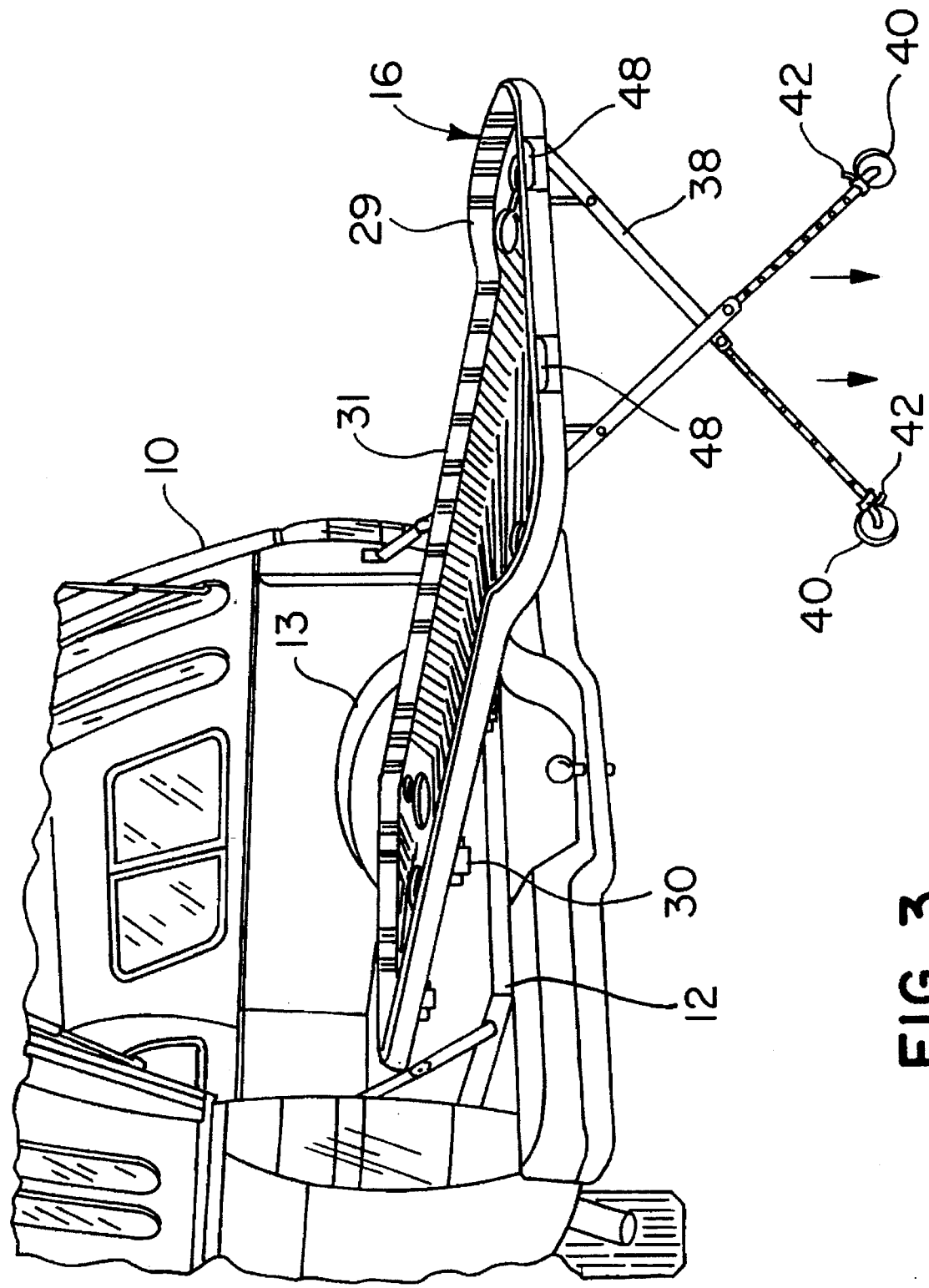
FIG. 3 is a perspective view similar to FIG. 2 showing the cargo tray further removed from the vehicle and a pair of legs partially lowered.
Figure 4:
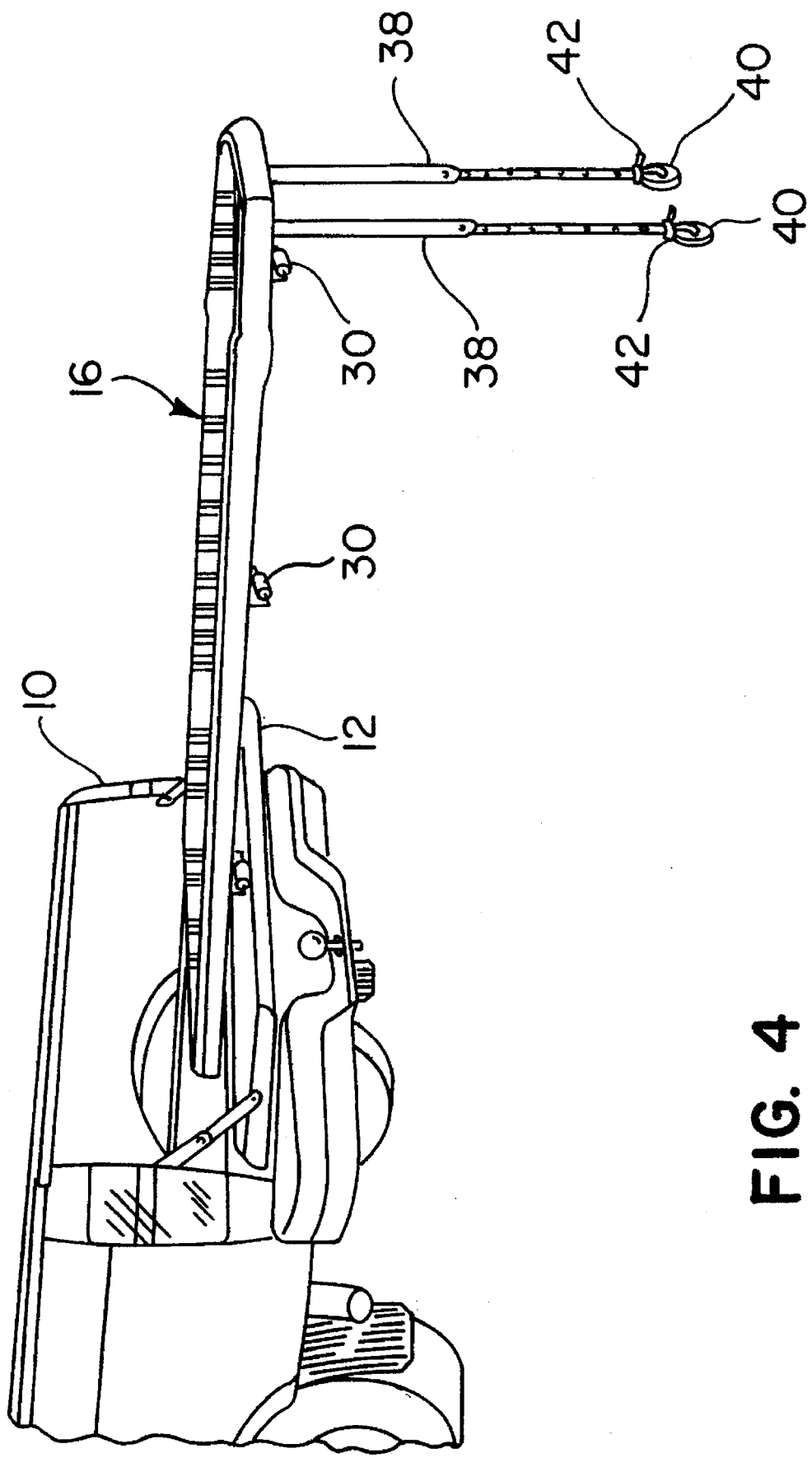
FIG. 4 is a perspective view similar to FIG. 3 showing the cargo tray supported by a pair of legs and the vehicle.
Figure 5:
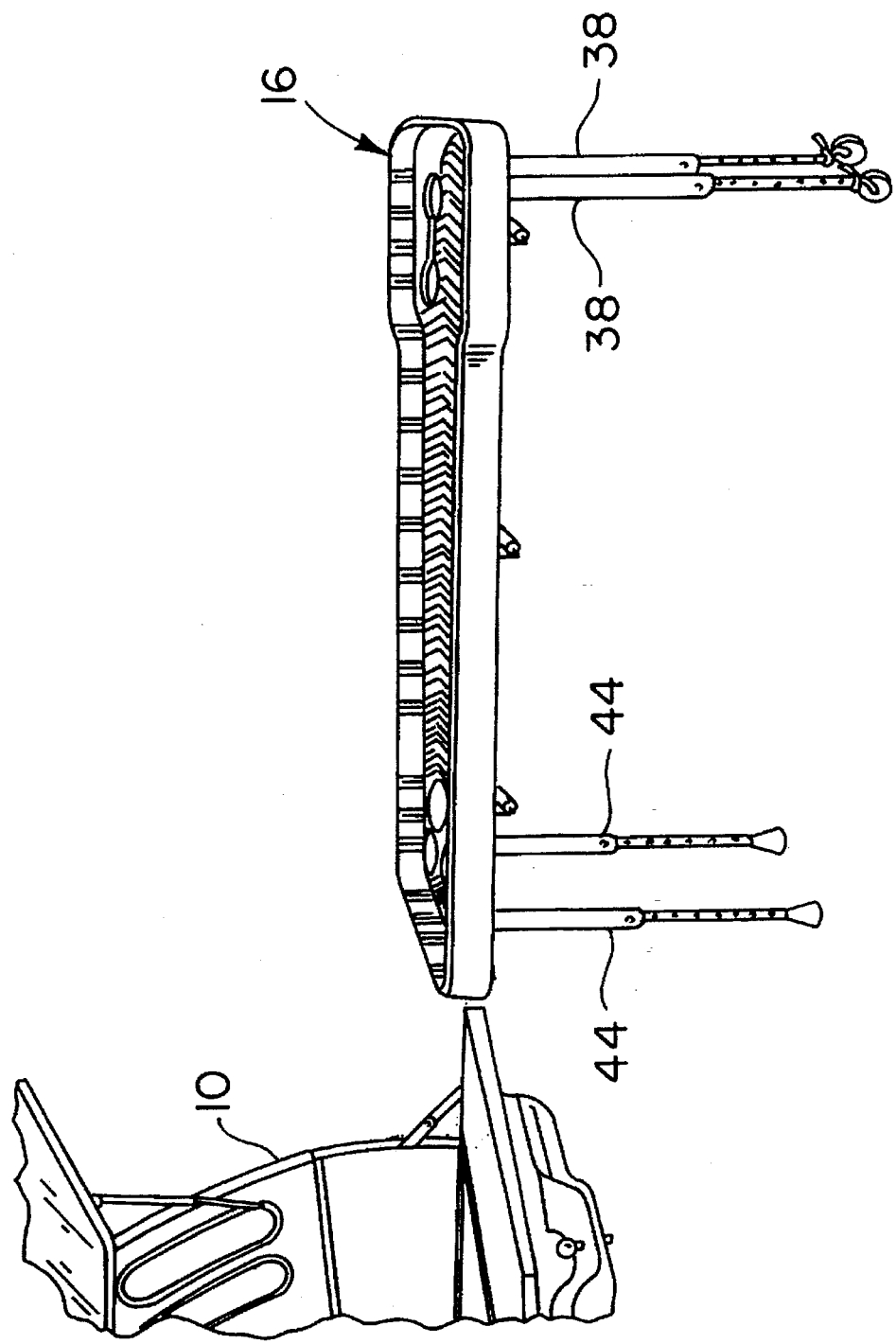
FIG. 5 is a perspective view showing the cargo tray self supporting and separate from the vehicle.

Referring now to FIGS. 1–6, a vehicle 10 such as a pick up truck, a van, a station wagon and the like has an elongated cargo space on a bed of the vehicle 10. At least a pair of laterally-spaced wheels are beneath the bed of the vehicle 10. The bed of the vehicle 10 has a bottom, a rear wall behind the cab or driver's seat, a tailgate 12 opposite the rear wall and a pair of side walls. The bottom of the vehicle bed has a pair of spaced side portions 13 lifted above the bottom of the vehicle bed such that the side portions 13 cover the at least a pair of wheels. Further, each side portion has an edge 14 proximal to the tailgate 12 of the vehicle 10.

The cargo tray 16 has a body portion 18 which has a top 20, a bottom 22, two opposite sides, a front end and a back end. A side wall 24 is formed on each of the opposite sides. A front wall 26 and a back wall 28 are formed at the respective front and back ends of the body portion 18. The walls 24, 26, 28 extend upwardly from the bottom 22 of the body portion 18. The height of the walls preferably is approximately four (4) inches.

Preferably, the body portion 18 is T-shaped having a first width at a first portion and a second width at a second portion. The width of the first portion is greater than the width of the second portion. When normally disposed in the vehicle 10, the flat body portion 18 of the cargo tray 16 covers the bottom of the vehicle bed. The broader front portion 29 of the cargo tray 16 extends between the side walls of the vehicle 10 from the proximal edge 14 to the tailgate 12. The narrower rear portion 31 extends between the side walls of the vehicle 10 from the proximal edge 14 to the rear wall of the vehicle's cargo area (FIGS. 7–10).

The cargo tray 16 is disposed in the vehicle 10 and is independent of the vehicle. There are no appurtenances such as rails, tracks, hold down members, etc. permanently installed in the vehicle 10 to which the cargo tray 16 is attached in any manner. No modification to the vehicle 10 is required. When disposed in the vehicle 10, the cargo tray 16 substantially covers the vehicle bed.

At least one pair and preferably three (3) or more pairs of spaced-apart roller means 30 are attached to the bottom portion 22 of the cargo tray 16 to permit the cargo tray 16 to be moved along the bed of the vehicle 10. The roller means 30 may be wheels, casters, rollers or other similar means known to persons skilled in the art. Preferably, at least three (3) roller means 30 are attached near each side of the cargo tray 16 with additional roller means 30 in the center to support the weight of the cargo on the cargo tray 16 and to facilitate movement of the cargo tray 12.

The body portion 18 of the cargo tray 16 is formed with a plurality of ribs 32. It is preferred that the ribs 32 be a series of parallel ridges or convolutions in a herringbone pattern between the sides of the cargo tray 16 such that one-half of the ribs 32 are formed at an angle from one side of the cargo tray 16 and the other one-half of the ribs 32 are formed at an identical angle from the other side of the cargo tray 16. The angled ribs 32 meet at approximately a lateral center line of the cargo tray 16. In this manner, the weight of the cargo is distributed across a plurality of ribs 32 and the cargo tray 16 is significantly strengthened. Additional strengthening of the cargo tray 16 is obtained by forming a frame 34 on the bottom 22 of the body 18 portion of cargo tray 16.

A plurality of spaced-apart wells 36 are formed in body portion 18 the cargo tray 16. The wells 36 are formed such that the top of each well 36 is in the same horizontal plane as the top of each rib 32. Thus, the entire upper surface of the bottom portion 18 of the cargo tray 16 is in the same horizontal plane. Each well 36 has a depth equal to the height of the ribs 32. The wells 36 are to receive therein cargo such as one (1) gallon and five (5) gallon buckets of paint, wallpaper paste, roofing tar and similar materials. The wells 36 are of different sizes to accommodate the respective bucket sizes. It is preferred that three (3) wells 36 for the five (5) gallon buckets be formed near the back wall 28 of the cargo tray 16 to have cargo with greater weight retained distal from the end of the vehicle 10. It is preferred to form two (2) wells 36 each capable of accommodating one (1) gallon buckets near each side wall 24 near the front wall 26 of the cargo tray 16. Thus, four (4) buckets of one (1) gallon capacity can be accommodated. When the buckets are disposed in the wells 36, the buckets are restrained from movement and the possibility of being overturned is significantly reduced. It is further preferred that each well 36 have side walls which are tapered inwardly such that the bottom of the well 36 have a diameter slightly less than the diameter of the top of the respective well 36. This configuration further reduces movement of the buckets.

Figure 7:
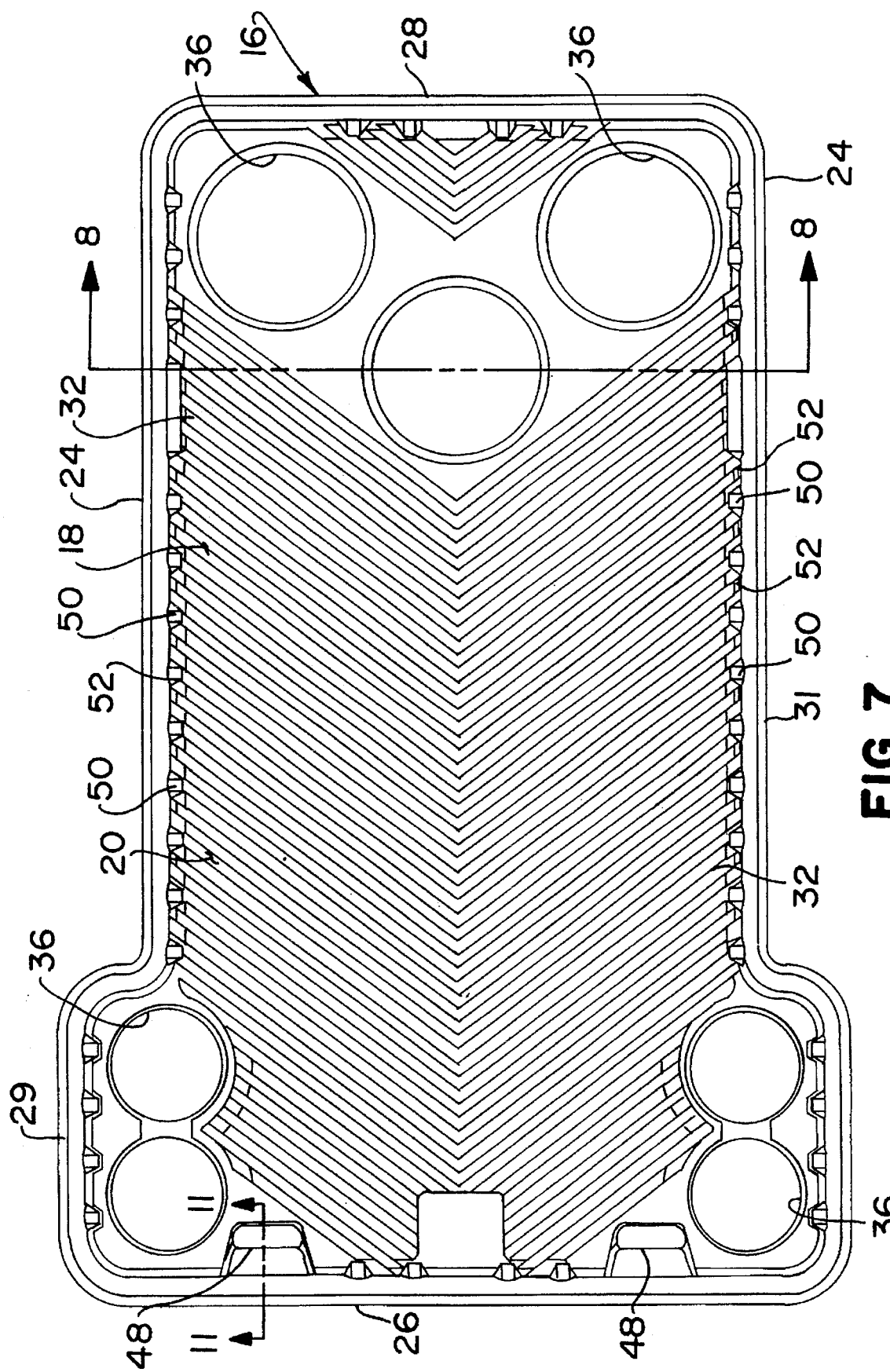
FIG. 7 is a top view of the cargo tray of the present invention.
Figure 8:
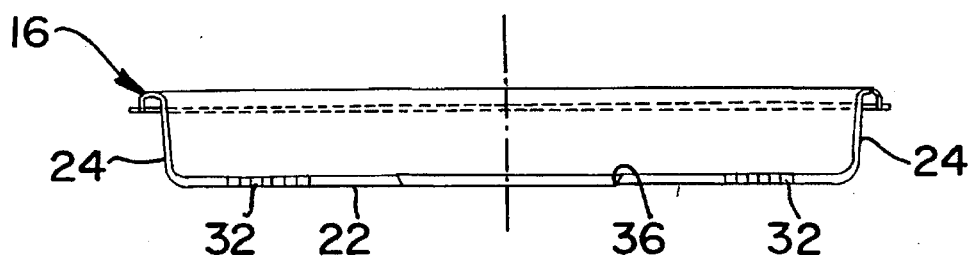
FIG. 8 is a cross-sectional view taken across the lines 8—8 of FIG. 7.
Figure 9:
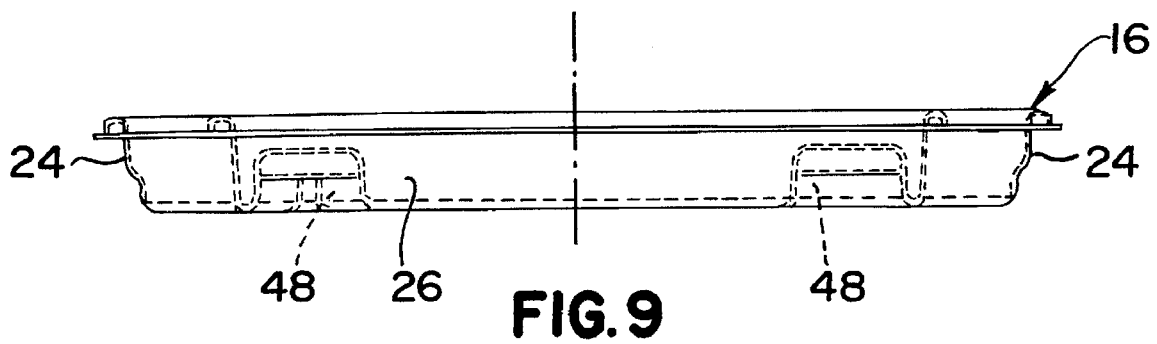
FIG. 9 is an end view of the front of the cargo tray of the present invention.
Figure 10:
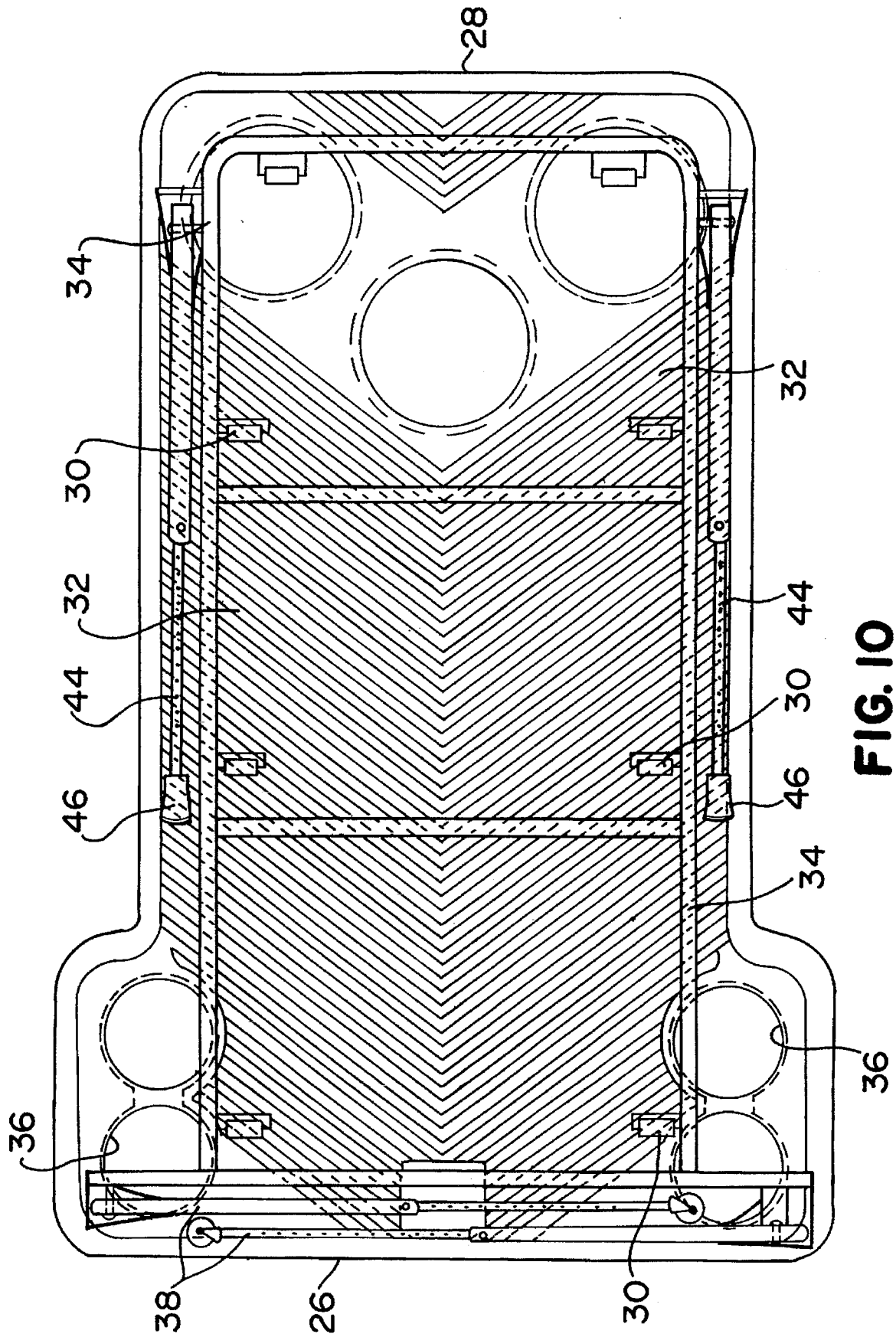
FIG. 10 is a bottom view of the cargo tray.

For ease of manufacture of the cargo tray 12, it is preferred that no ribs 32 be formed between the adjoining wells 36 (FIG. 7).

Expandable support means such as a first pair of legs 38 are hingedly laterally connected to the underneath of the front end of the cargo tray 16. The end of each leg of the first pair of legs 38 opposite from the hinge has a wheel or caster 40 connected thereto. Each wheel or caster 40 has a locking means 40.

A second pair of legs 44 is hingedly longitudinally connected to the bottom 22 of the body portion 18 near the back wall 28 of the cargo tray 16 and each leg 44 extends toward the front wall 26 of the body portion 18, approximately parallel to the respective side walls 24. The first pair of legs 38 and the second pair of legs 44 each fold under the cargo tray 16 such that both pairs of legs 38, 44 do not protrude below the roller means 30 on the bottom 22 of the body portion 18 the cargo tray 16. In this manner, the cargo tray 16 can be slidably moved along the bed of the vehicle 10 without obstruction. The end of each leg of the second pair of legs 44, distal from the hinge, preferably has a non-skid cap 46 disposed thereon. If desired, a wheel with a locking means may be attached to the end of each leg of the second pair of legs 44.

It is preferred that the individual legs of each pair of legs 38, 44 be expandable such as telescoping. Means are provided to lock each leg in a selected lengthened or shortened position. This permits the cargo tray 16 to be maintained in a substantially level attitude even with uneven surfaces on which the vehicle 10 and the cargo tray 16 may be disposed. This feature further permits the cargo tray 16 to be used with vehicles having the vehicle bed at varying heights above the surface.

Figure 6:
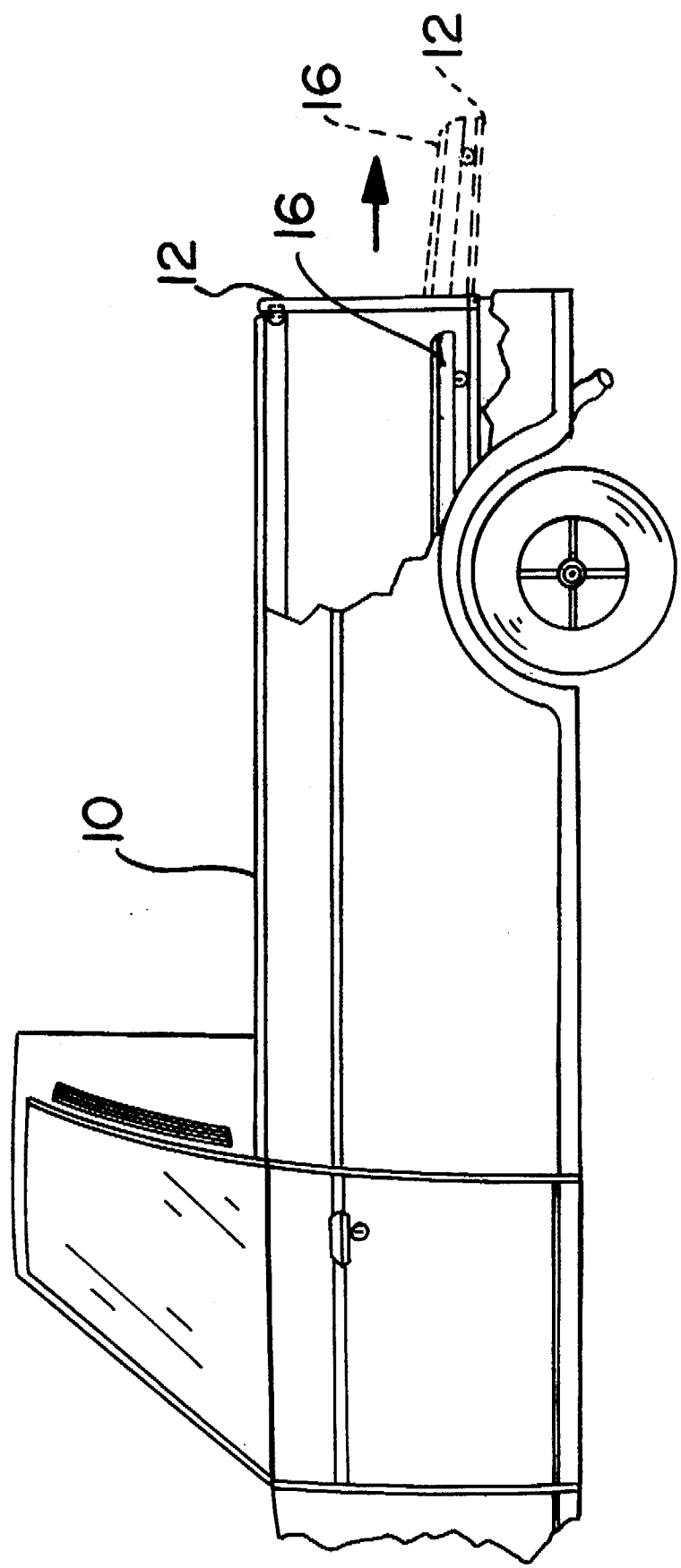
FIG. 6 is a partially cut-away view showing the cargo tray disposed within the vehicle.

When the vehicle 10 is in motion, the cargo tray 16 is completely contained in the vehicle with the front wall 26 of the cargo tray 16 in contact with, or approximately in contact with, the tailgate 12 of the vehicle 10 and the side walls 24 of the cargo tray 16 are close to the sides of the vehicle 10 (FIG. 6).

Figure 11:
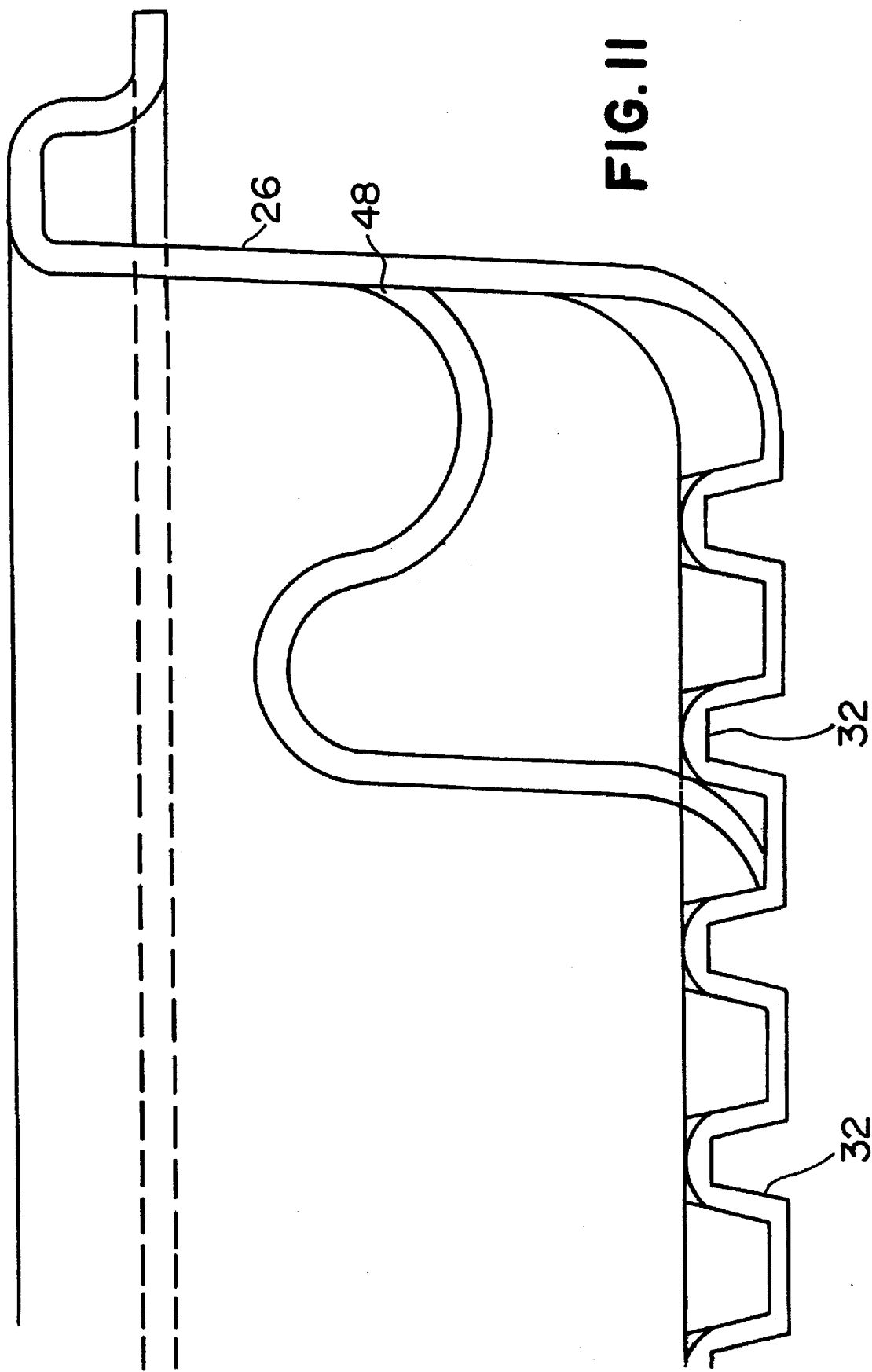
FIG. 11 is an enlarged cross-sectional view of the handle on the front wall of the cargo tray.

When the vehicle 10 is stopped, the tailgate 12 is lowered and the user grasps the front wall 26 of the cargo tray 16 by handles 48 (FIG. 11) formed in the front wall 26 thereof. The user slidably rolls the cargo tray 16 outwardly from the vehicle 10 to a desired length and lowers the first pair of legs 38. The laterally hinged first pair of legs 38 are easily accessible to a user standing at the front wall 26 of the cargo tray 16 and the first pair of legs 38 are completed unfolded by the user until the wheels 40 on the ends of the first pair of legs 38 contact the surface on which the user is standing. The cargo tray 16 may be slidably rolled out of the vehicle 10 to a further length with the first pair of legs 38 supporting the first end of the cargo tray 16. The back end of the cargo tray 16 is supported by the vehicle 10. When the cargo tray 16 has been partially removed and extended from the vehicle 10 a desired length, the wheels 40 on the first pair of legs 38 are locked with the locking means 42 and the user may load or unload the cargo tray 16 with cargo. In the event that heavy items of cargo such as five (5) gallon buckets are to be loaded or unloaded, the user does not have to enter the vehicle 10 and move other items of cargo to have access to the buckets. Neither does the user have to lift the heavy items above the sides of the vehicle 10. Further, if the user doesn't need to remove or load all of the cargo, the extended cargo tray 16 permits rapid and easy access to the cargo which is needed.

The cargo tray 16 of the present invention provides an additional advantage. The cargo tray 12 can be completely removed from the vehicle 10 by one individual and, using the first pair of legs 38 and the second pair of legs 44, the cargo tray 16 is self supporting. The user extends the cargo tray 16 outwardly from the vehicle sufficiently for the second pair of legs 44 to clear the down folded tailgate 12 while the rear end of the cargo tray 16 and at least one roller means 30 remains in contact with the bed of he vehicle 10 (or the tailgate 12 depending upon the design of the vehicle 10 and the manner in which the tailgate 12 opens). The user unfolds the longitudinally hinged second pair of legs 44 which are hinged near to the back wall 28 of the cargo tray 16 with the ends of the legs oriented toward the front wall 26 of the cargo tray 16. When the second pair of legs 44 are completely unfolded, the user may move the vehicle 10 away from the self supporting cargo tray 16 or may grasp the rear end of the cargo tray 12 and roll it away from the vehicle 10 using the unlocked wheels 40 on the first pair of legs 38 are a means of easily moving the cargo tray 16.

This feature of the present invention permits the cargo tray 16 to be used independently of the vehicle 16 or, alternately, used in conjunction with the vehicle 10. When used independently of the vehicle 10, the cargo tray 16 may be loaded with a cargo to be used at a work site and the user has the option of transporting a full cargo to the work site and leaving the cargo tray 16 with the cargo at the work site. The vehicle 10 can be used for other purposes, or with a second cargo tray 16 of the present invention, may transport a cargo to a second work site.

Alternately, the user, in loading the vehicle 10, may dispose the rear end of the cargo tray 12 on the edge of the cargo area of the vehicle 10 and load the cargo into the cargo tray 16. The entire cargo tray 16 is readily available and the user can place the cargo in sequence for initial and later use for distribution of weight, or for any loading pattern most efficient for the particular purposes. After loading the cargo tray 16, the user simply rolls the cargo tray 16 into the vehicle 10 by pushing on the front end of the cargo tray 16 and with the tray 16 rolling on the wheels 10 on the first pair of legs 38 and on the roller means 30 on the cargo tray 16. When the cargo tray 16 is almost fully rolled into the vehicle 10, the first pair of legs 38 are folded up beneath the cargo tray 16 and the cargo tray 16 is completely rolled into the vehicle 16, the tailgate 12 raised end secured, and the loaded vehicle 10 is ready for transport of the cargo.

Unloading of the loaded vehicle 10 is the reverse of the above procedure.

Figure 12:
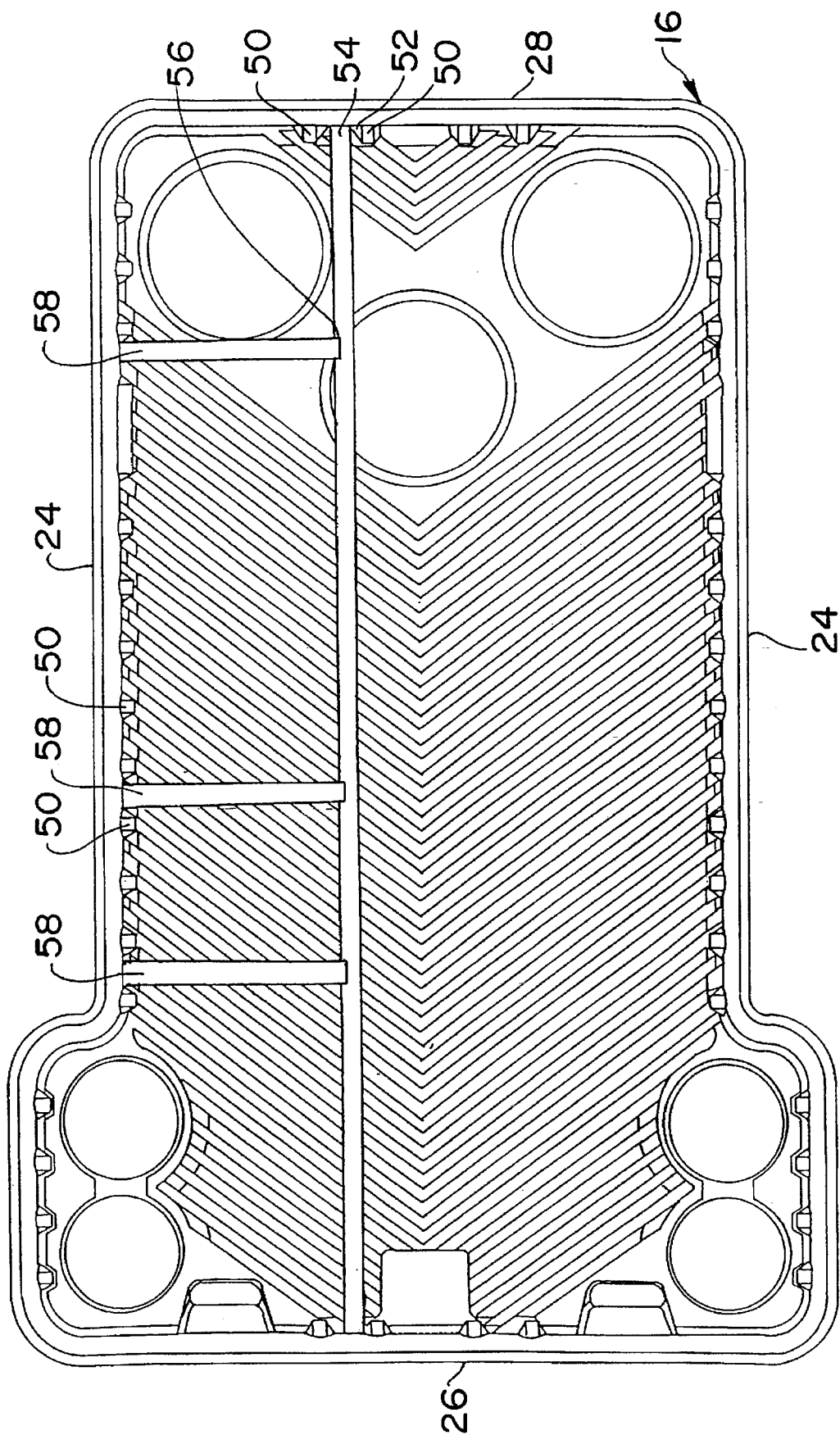
FIG. 12 is a top view of the cargo tray showing beams dividing the cargo tray into segments.

A further feature of the cargo tray 16 is a plurality of spaced-apart protrusions 50 formed on the side walls 24, the front wall 26 and the back wall 28 of the cargo tray 16. The spaces between the protrusions 50 form and define a corresponding plurality of spaced-apart notches 52 therebetween. The protrusions 50 on opposing walls are diametrically opposed. A beam 54 disposed in any pair of diametrically-opposed notches serves to segment the body portion 18 of the cargo tray 16 to provide for separation of items of cargo and to restrict movement of cargo during transport (see U.S. Pat. No. 4,958,876). Disposing a beam 54 longitudinally between the notches 52 in the front wall 26 and the back wall 28 of the cargo tray 16 permits the separation of cargo having long lengths (e.g., pipe, ladder, lumber, etc.) from smaller and shorter items of cargo. Further, forming a plurality of notches 56 along the length of the longitudinal beam 54 permits the forming of smaller segments by disposing one or more beams 58 laterally between the notches 56 in the longitudinal beam 54 and the notches 52 in the side walls (FIG. 12). Thus, it is possible to use one or more longitudinal beams 54 to form a segment extending substantially the length of the cargo tray 16 and to use lateral beams 58 to form smaller segments having varying dimensions for storage and separation of other items of cargo. U.S. Pat. No. 4,958,876 does not suggest this segmentation of the cargo area nor the use of a longitudinal beam.

The beams 54, 58 and the notches 52, 56 provide a very versatile cargo tray 16 which can be loaded to have a separation or a mix of cargo items to meet the specific needs of the user. The cargo tray 16 can be easily loaded and unloaded by rolling the cargo tray 16 so that the user does not have to lift heavy items to a height greater than the bed of the vehicle 10. The user does not have to crawl inside the vehicle nor to move many items of cargo to have access to a particular item of cargo.

Preferably, the cargo tray 16 is formed from a lightweight plastic material such as recyclable, U.V. stabilized, high molecular weight polyethylene which is used in traditional bed liners for vehicles. This material is resistant to chemicals and withstands temperatures ranging from −40° to 140° F. The cargo tray 16 may be made of other materials including wood and metal.

Obviously, many modifications may be made without departing from the basic spirit of the present invention. Accordingly, it will be appreciated by those skilled in the art that within the scope of the appended claims, the invention may be practiced other than has been specifically described herein.

We claim:

1. A cargo tray for use in combination with a vehicle having an elongated cargo space terminating at a tailgate, comprising:

a body portion having a top, a bottom, two opposite sides, a first end, a back end, a length between the front end and the back end, a width between the sides, the front end of the body portion being adjacent to the tailgate of the vehicle when the cargo tray is disposed in the vehicle, the cargo tray being independent of, and devoid of any attachment to, the vehicle, a side wall formed on each side, a front wall and a back wall, the walls extending upwardly from the bottom of the body portion, a plurality of spaced-apart roller means attached to the bottom of the body portion wherein the cargo tray is slidably movable along the length of the elongated cargo space within the vehicle and wherein the cargo tray is slidably removable from the cargo space, a first pair of legs foldably connected laterally to the bottom of the body portion near the front end thereof, a second pair of legs foldably connected longitudinally to the bottom of the body portion near the back end thereof, wherein, when the cargo tray is partially removed from the vehicle, the unfolded first pair of legs support the front end of the cargo tray and the back end of the cargo tray is supported on the vehicle, wherein, when the cargo tray is completely removed from the vehicle, the unfolded first pair of legs and the unfolded second pair of legs support the cargo tray independently of the vehicle, all of the walls of the body portion having a plurality of spaced-apart protrusions formed therein, defining a corresponding plurality of spaced-apart notches therebetween, a respective beam being removably received in a respective pair of diametrically-opposed notches thereby forming segments in the cargo tray for storage and separation of cargo.

2. The combination of claim 1, wherein a first beam is disposed in respective opposing notches in said front wall and in said back wall of said cargo tray, said first beam extending longitudinally in said cargo tray, said first beam further having a plurality of spaced apart notches formed therein, said spacing corresponding to notches in said side wall, a second beam disposed in one of said notches in said first beam and extending to an opposing notch in said side wall, wherein a portion of said cargo tray is sectioned between said first beam, said second beam and said walls of said cargo tray to permit separation and retention of cargo therein.

3. The cargo tray of claim 1, wherein the body portion is T-shaped, having a first width at the front end and a second width at the back end, the first width being greater than the second width.

4. The cargo tray of claim 1, further comprising a plurality of spaced-apart ribs being formed in the body portion, the ribs being in a herringbone pattern to provide strength to the cargo tray and to support a heavy cargo therein.

5. The cargo tray of claim 1, further comprising a plurality of spaced-apart wells being formed in the top of the body portion, wherein cargo is received and retained in said wells to prevent movement and overturning of said cargo.

6. A cargo tray in combination with a vehicle comprising a vehicle bed and at least one pair of laterally spaced wheels therebeneath, the vehicle bed having a bottom, a front wall, a tailgate opposite said front wall and a pair of side walls, the bottom of the vehicle bed including a pair of spaced side portions thereabove to cover said at least one pair of laterally spaced wheels, each side portion having an edge proximal to the tailgate of the vehicle bed, the cargo tray comprising a body portion having a top, a bottom, two opposite sides, a front end, a back end, a side wall formed on each side, a front wall and a back wall, the walls extending upwardly from the bottom of the body portion, the cargo tray being T-shaped having a first width at a first portion and a second width at a second portion, the first width being greater than the second width, the cargo tray being disposed on the vehicle bed independent of, and devoid of any attachment to, said vehicle, and capable of being slidably moved outwardly from the vehicle bed a desired length and further being capable of being slidably completely removed from the vehicle bed, wherein, being disposed on the vehicle bed, the cargo tray substantially covers the vehicle bed, the first portion of the cargo tray having the greater width extending between the side portions of the vehicle and from the proximal edge of the respective side portions to the tailgate, the second portion of the cargo tray extending between the side portions of the vehicle and from the proximal edge of the respective side portions to the rear wall of the vehicle bed, at least one pair of spaced-apart roller means being attached to the bottom of the body portion wherein the cargo tray is slidably movable along the length of the elongated vehicle bed within the vehicle and wherein the cargo tray is slidably removable from the vehicle bed, a first pair of legs foldably connected laterally to the bottom of the floor portion near the front end thereof, a second pair of legs foldably connected longitudinally to the bottom of the floor portion near the back end thereof, wherein, when the cargo tray is partially removed from the vehicle, the unfolded first pair of legs support the front end of the body portion and the back end of the body portion is supported in the vehicle, and wherein, when the cargo tray is completely removed from the vehicle, the unfolded first pair of legs and the unfolded second pair of legs support the cargo tray independently of the vehicle, a plurality of spaced-apart ribs formed in the body portion, the ribs being in a herringbone pattern to provide strength to the cargo tray and to support a heavy cargo therein, a plurality of spaced-apart wells formed in the top of the body portion, wherein cargo is received and retained in said wells to prevent movement and overturning of said cargo, and all of the walls of the tray having a plurality of spaced-apart protrusions formed therein, defining a corresponding plurality of spaced-apart notches therebetween, a respective beam being removably received in a respective pair of diametrically-opposed notches thereby forming segments in the cargo tray for storage and separation of cargo.

7. A cargo tray for use in combination with a vehicle having a cargo space, comprising:

a body portion having a top surface, a bottom surface, a pair of sidewalls, a front wall and a back wall, the walls extending upwardly from the top surface of the body portion, a plurality of spaced-apart roller means attached to the bottom surface of the body portion wherein the cargo tray is slidably movable along the cargo space, the tray being independent of the vehicle and devoid of any attachment to the vehicle, the vehicle being unmodified, all of the walls of the tray having a plurality of spaced-apart protrusions formed therein, defining a corresponding plurality of spaced-apart notches therebetween, a respective beam being removably received in a respective pair of diametrically-opposed notches thereby forming segments in the cargo tray for storage and separation of cargo.

8. The cargo tray of claim 7, wherein at least one beam is removably disposed laterally in the cargo tray and at least one beam is removably disposed longitudinally in the cargo tray thereby forming a plurality of segments in the cargo tray.

9. The cargo tray of claim 7, further comprising:

a first pair of legs foldably connected laterally to the bottom of the body portion near the front wall thereof, a second pair of legs foldably connected longitudinally to the bottom of the body portion near the back wall thereof, wherein, when the cargo tray is partially removed from the vehicle, the unfolded first pair of legs support the front wall of the cargo tray and the back wall of the cargo tray is supported on the vehicle, and wherein, when the cargo tray is completely removed from the vehicle, the unfolded first pair of legs and the unfolded second pair of legs support the cargo tray independently of the vehicle.

10. The cargo tray of claim 7 further comprising a plurality of spaced-apart wells being formed in the top of the body portion, wherein cargo is received and retained in said wells to prevent movement and overturning of said cargo when the vehicle is in motion.

* * * * *